Aug. 26, 1958  H. K. H. SCHEFFTER ET AL  2,849,103
AUGER CONVEYOR
Filed July 25, 1955  3 Sheets-Sheet 1
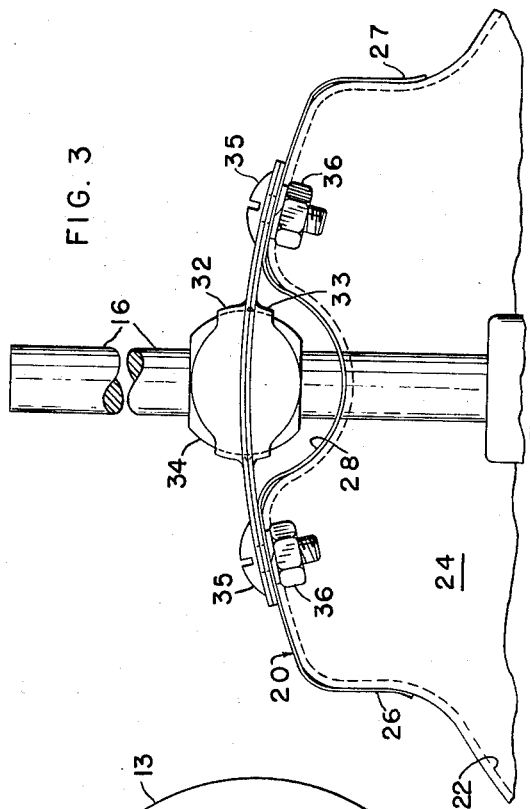
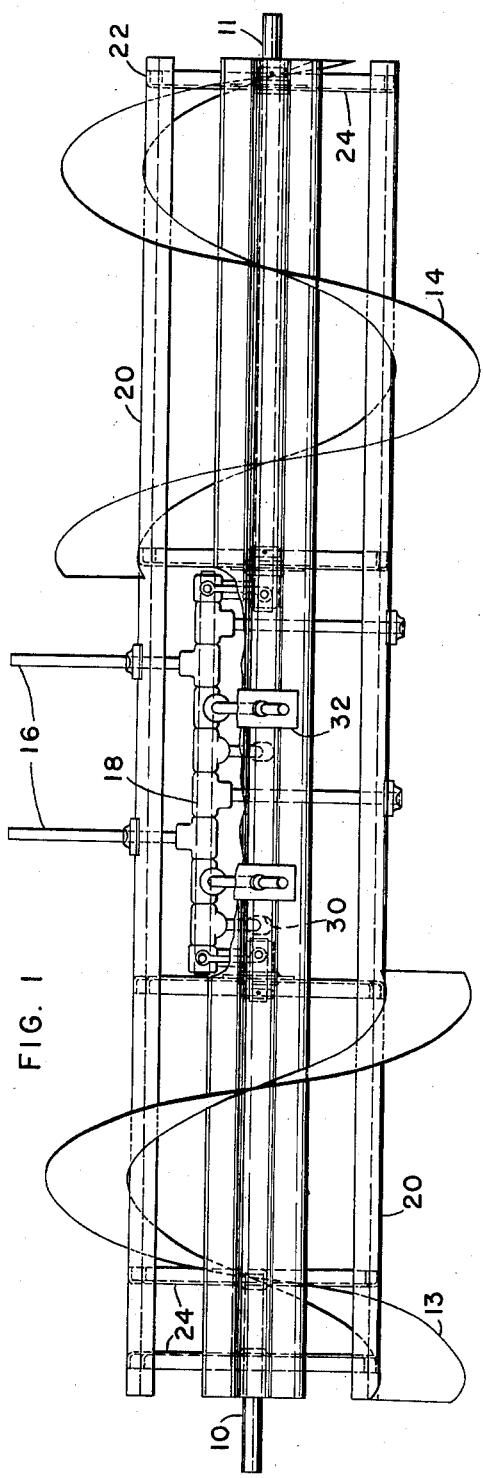
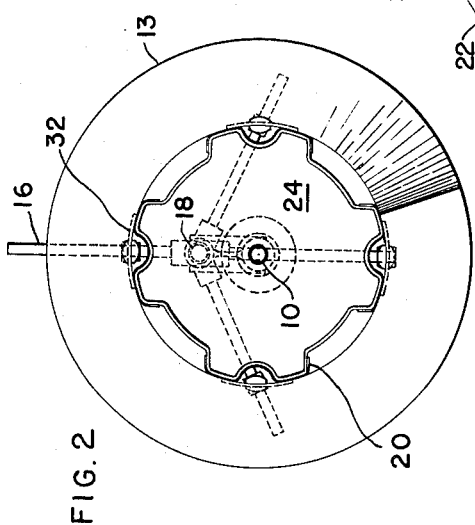
INVENTORS:
HELMUT K. H. SCHEFFTER
WERNER A. W. FROMME
JOSEPH F. VRASTIL
BY: James E. Nilles
ATTORNEY

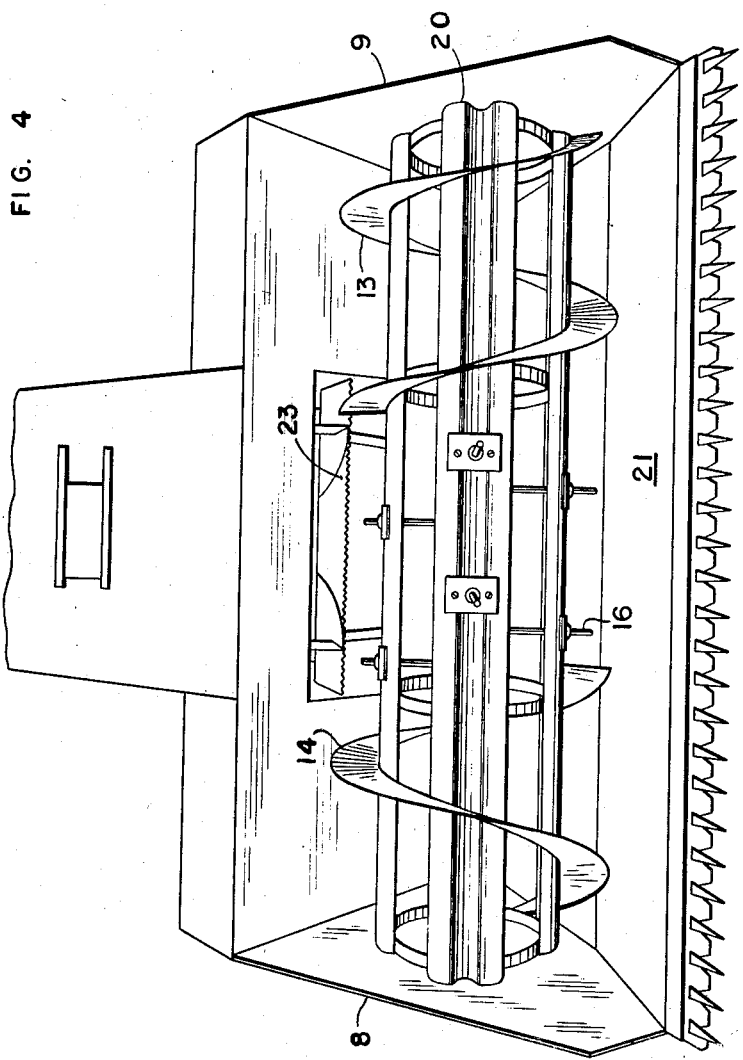

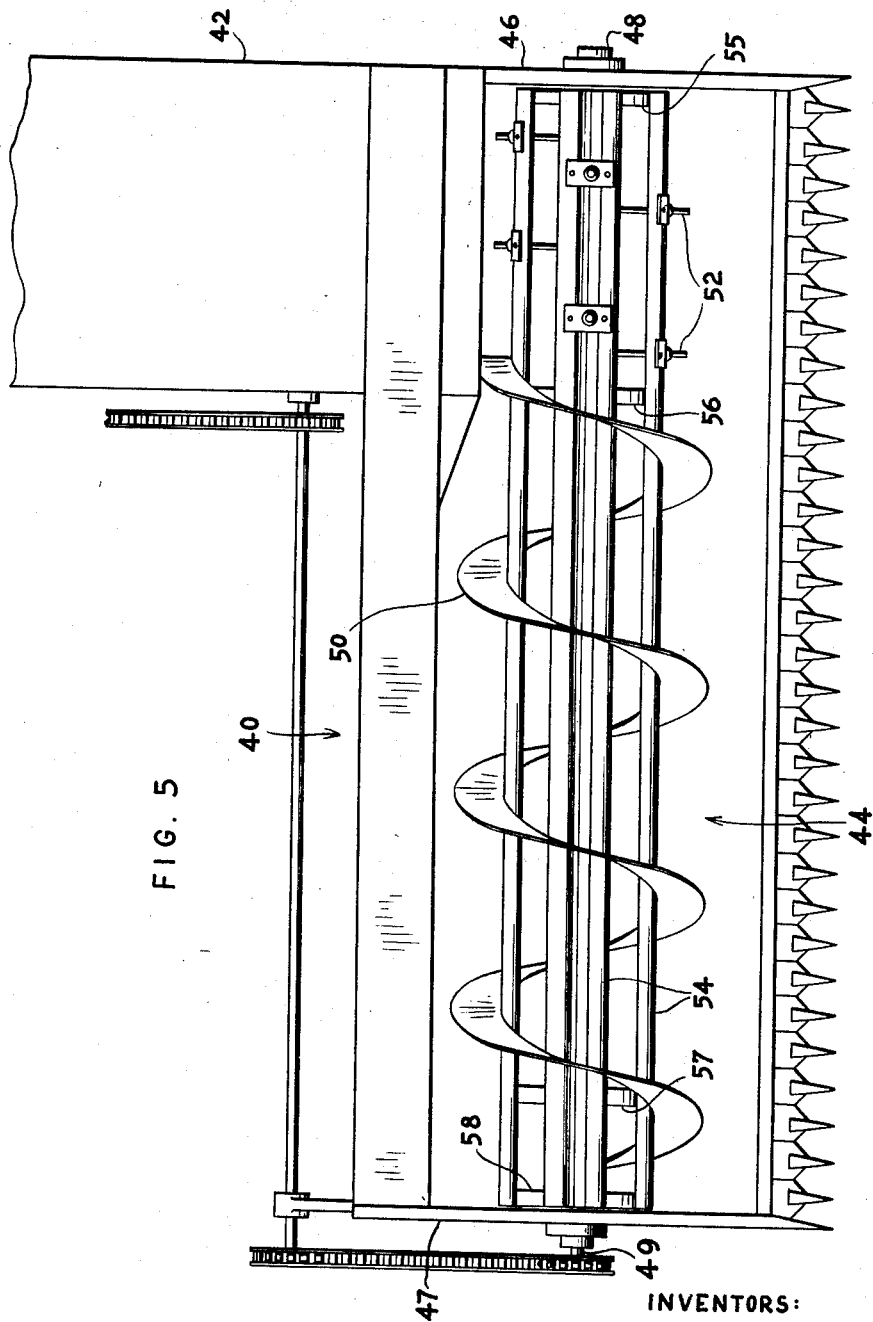

2,849,103

AUGER CONVEYOR

Helmut K. H. Scheffter, Cologne-Lindenthal, Werner A. W. Fromme, Cologne, and Joseph F. Vrastil, Westhoven, near Cologne, Germany, assignors to Massey-Ferguson Inc., a corporation of Maryland Application July 25, 1955, Serial No. 524,142

7 Claims. (Cl. 198—104)

This invention relates to crop handling devices such as are employed on combines or forage harvesters, for example, and relates more specifically to an improved crop feeder for the harvesting table.

This invention is particularly concerned with harvesting tables such as shown in the co-pending application for U. S. patent, Serial Number 303,321, filed August 8, 1952 and entitled, "Harvesting Mechanism," now Patent Number 2,755,912, issued July 24, 1956, and relates more specifically to an improvement of the auger tube constructions shown in that application.

An object of this invention is to provide a crop feeding mechanism for a harvester which is economical to manufacture, light in weight, extremely rigid in construction and easily maintained and serviced.

A general object of this invention is to provide an improved auger tube construction for a harvesting machine.

Other objects and advantages of this invention will become more apparent as this disclosure progresses, reference being had to the accompanying drawings in which:

Figure 1 is a plan view of this invention.

Figure 2 is an end view of the device shown in Fig. 1.

Figure 3 is a fragmentary view, on an enlarged scale, showing the means for mounting the finger bearings to the tube.

Figure 4 is a front perspective view of a harvesting table in which the improved feeder is utilized.

Figure 5 is a plan view of a modification of the invention.

Referring more particularly to Figure 4 of the drawings, the crop feeder is adapted to be mounted in the side walls 8, 9 of the harvesting table by means of its extending axial portions 10, 11. This crop feeder is rotatably driven, in the well known manner, through a sprocket or pulley (not shown) which is secured to one of its axial portions and serves to convey the crop material from either end of the harvesting table inwardly towards the central portion thereof by means of the helical screws 13, 14 which are wound around either end of the crop feeder body proper. In the central portion of the crop feeder are the well known retractable fingers 16 which are pivotally mounted at their inner end on the eccentric shaft 18.

Conventional practice in the past has been to make the tube proper, that is, that portion on which the flights 13 and 14 are mounted, of solid tubular construction. The practice has been, in most cases, to make this tube of completely enclosed construction so as to preclude any grain, straw or other foreign matter from accumulating within the tube. In fact, it has been felt necessary to keep the tube free of any obstruction or projections such as bolt heads, etc., in order to prevent the crop material from being wound upon or entangled about the auger tube. Other prior art devices have been used wherein the central portion of the tube, that is that portion between the auger flights, is made of "open" construction. Such a device is shown in the U. S. Patent #2,464,919 issued March 22, 1949 wherein the central portion is comprised of axially extending bars which connect the auger tubes at their adjacent ends.

With the crop feeder made according to this invention, the auger "tube" comprises a series of circumferentially spaced sheet metal formings 20 which are arranged in parallelism in an axial direction of the crop feeder. These formings or ribs 20 are secured, as by welding, to the axial extending flange portions 22 of the discs 24 and thus form an open rotary structure. It has been found in practice that by making this rotary structure of sufficient diameter, wrapping of the crop material therearound is eliminated. Discs 24 are axially spaced along the length of the crop feeder, and shafts 10 and 11 and the eccentric crank 18 are mounted thereto. The ribs 20, as best shown in Figure 3, are channel shaped in cross section and have radially inwardly extending flange portions 26, 27 and radially inwardly extending curved central portion 28. By means of this particular cross sectional shape, the ribs 20 are made especially rigid and resistant to twisting moments to which they are subjected along their length. As shown in Figure 1 the central portions of ribs 20 have enlarged apertures 30 through which the fingers 16 freely reciprocate and also oscillate. The complementary mounting brackets 32, 33 which support the bearings 34 are secured across the curved central portion 28 of the ribs 20 and secured to the ribs 20 by means of bolts 35 and nuts 36. The fingers 16 are slidable within the aperture of bearing 34 and the bearing 34 is free for limited rotation within the mounting brackets 32, 33. If further explanation of these bearings, their mountings or the action of the reciprocating fingers is deemed necessary, reference may be had to the U. S. Patent #2,701,634, issued February 8, 1955.

In practice it has been found that any crop material entering the tube quickly falls out through the open areas between the ribs 20 at the bottom side of the tube and drops onto the auger table 21. The auger flights 13, 14 then serve to sweep the material inwardly towards the central portion of the auger tube where the fingers convey the material rearwardly into the vertical elevator 23 in the conventional manner.

Figure 5 shows the invention as applied to a "pull type" harvester table. In this table, or harvesting platform 40, the rearwardly extending elevator 42 is located at one end of the table. The lateral conveyor, or material handling device 44 is rotatably mounted in the end walls 46, 47 of the table by its shaft portions 48, 49 respectively. A single helical flight 50 is used in this type of table and extends from one end of the crop feeder 44 inwardly towards the longitudinal conveyor 42 and terminates a distance from the other end of the feeder 44. On that portion of the feeder 44 which is directly in front of the elevator 42 are located the crop engaging members 52 which feed the crop material into the elevator 42. The body proper, or "tube," of the crop feeder here again comprises rib members 54, similar to those shown in Figure 1, which are secured to the axially spaced discs 55, 56, 57 and 58, which in turn are similar to the discs shown in Figures 1 and 2. Shaft portions 48, 49 are secured to discs 55, 56 and 57, 58 respectively for rotation therewith.

With this completely open auger, the crop material does not accumulate inside, but, rather, freely drops onto the auger table. As will be appreciated by those skilled in this art, the retractable fingers occasionally break, or bend, and require replacement. The various types of movable crop engaging members, which are located at the central portion of the auger conveyor all require lubrication, adjustment and replacement to some extent or another. With this open construction auger, the performance of these tasks is facilitated. Furthermore, there has been provided a light weight auger tube which is extremely rigid, of economical design and which is highly efficient in operation.

Having thus shown and described the invention, we claim:

1. In a material handling device, a series of axially spaced discs, a plurality of circumferentially spaced rib members axially positioned in parallelism and rigidly secured to said discs to form an open rotary structure whereby accumulation of material therein is precluded, an auger flight wound about each end of said structure, said flights extending inwardly from the ends of said structure and having their adjacent ends terminating a distance from each other to define a central portion of said ribs, an eccentric shaft mounted within said structure and between said flights, retractable fingers pivotally secured at their inner ends to said eccentric shaft, mounting means secured to said ribs through which said fingers are adapted to reciprocate, a shaft extending from either end of said device to rotatably support the latter.

2. A device as defined in claim 1 further characterized in that said ribs in cross section have a central curved portion extending inwardly, said curved portion having enlarged apertures through which said fingers reciprocate.

3. In a material handling device, a series of axially spaced discs having axial depending flanges, a plurality of circumferentially spaced rib members axially positioned in parallelism and rigidly secured to the flanges of said discs to form an open rotary structure whereby accumulation of material therein is precluded, an auger flight wound about each end of said structure, said flights extending inwardly from the ends of said structure and having their adjacent ends terminating a distance from each other to define a central portion along the length of said ribs, an eccentric shaft mounted within said structure and between said flights, retractable fingers pivotally secured at their inner ends to said eccentric shaft, mounting means secured to said ribs through which said fingers are adapted to reciprocate, a shaft extending from either end of said device to rotatably support the latter.

4. A device as defined in claim 3 further characterized in that said ribs in cross section are generally channel shape and have a central curved portion extending inwardly, said curved portion having enlarged apertures through which said fingers reciprocate.

5. In an elongated handling device, a series of axially spaced discs having axial depending flanges around their periphery, a plurality of circumferentially spaced channel shaped rib members axially positioned in parallelism and rigidly secured to the flanges of said discs to form a substantially open rotary structure whereby accumulation of material therein is precluded, an auger flight wound about each end of said structure, said flights extending inwardly from the ends of said structure and having their adjacent ends terminating a distance from each other to define a central portion of said ribs, an eccentric shaft secured to some of said discs within said structure and located between said flights in an axial direction, retractable fingers pivotally secured at their inner ends to said eccentric shaft, mounting means secured to said ribs through which said fingers are adapted to reciprocate, a shaft extending from either end of said device to rotatably support the latter.

6. An elongated rotatable crop-feeder comprising, in combination, a pair of axially spaced end disks, a plurality of parallel rib members extending between and being secured to said end disks, said rib members being circumferentially spaced about said disks so as to form therewith a light, rigid, openwork frame of cylindrical configuration, an auger-type conveyor flight wound about and secured to said ribs for feeding a crop axially of the frame, said flight extending from one end of said frame to a point intermediate the frame, crop-engaging members for feeding the crop tangentially of said frame, said members being mounted on said ribs adjacent said point where the end of said auger is located, and shaft portions extending from opposite sides of said end disks for rotatably supporting the feeder in operating position.

7. An elongated rotatable crop-feeder comprising, in combination, a pair of axially spaced end disks having axially extending mounting portions thereon, a plurality of parallel rib members having a channeled cross section extending between and being secured to the mounting portions of said end disks, said rib members being circumferentially spaced about said disks so as to form therewith a light, rigid, openwork frame of cylindrical configuration, a pair of opposed auger type conveyor flights wound about and secured to said ribs for feeding the crop axially and toward the center of the frame, said flights extending from each end of said frame to spaced points intermediate the frame, crop-engaging members for feeding a crop tangentially of said frame, said members being mounted on said ribs between said spaced points and intermediate said flights, and shaft portions extending from opposite sides of said end disks for rotatably supporting the feeder in operating position.

References Cited in the file of this patent
UNITED STATES PATENTS

| | | |
|---|---|---|
| 1,099,311 | Otto | June 9, 1914 |
| 2,464,919 | Carroll | Mar. 22, 1949 |
| 2,608,283 | Oehler | Aug. 26, 1952 |
| 2,617,518 | Anderson | Nov. 11, 1952 |
| 2,633,231 | Pilcher | Mar. 31, 1953 |